(12) United States Patent
Roth et al.

(10) Patent No.: US 6,555,740 B2
(45) Date of Patent: Apr. 29, 2003

(54) EXTENDIBLE SOLAR GENERATOR WITH AN EXTENDIBLE SUPPORTING ARRAY STRUCTURE

(75) Inventors: Martin Roth, Taufkirchen (DE); Franz Sperber, Kolbermoor (DE); Walter Stich, Miesbach (DE)

(73) Assignee: Astrium GmbH, Munich (DE)

(*) Notice: Subject to any disclaimer, the term of this patent is extended or adjusted under 35 U.S.C. 154(b) by 0 days.

(21) Appl. No.: 09/968,709

(22) Filed: Oct. 2, 2001

(65) Prior Publication Data

US 2002/0040726 A1 Apr. 11, 2002

(30) Foreign Application Priority Data

Oct. 2, 2000 (DE) .......................... 100 48 846

(51) Int. Cl.[7] .............................. H01L 31/045
(52) U.S. Cl. ............... 136/245; 136/244; 136/291; 136/292; 244/173
(58) Field of Search ................. 136/244, 245, 136/251, 292, 291; 244/173

(56) References Cited

U.S. PATENT DOCUMENTS

| | | | | |
|---|---|---|---|---|
| 3,690,080 A | * | 9/1972 | Dillard ................. | 52/108 |
| 3,735,942 A | | 5/1973 | Palz ..................... | 244/173 |
| 4,151,872 A | * | 5/1979 | Slysh et al. ........... | 160/213 |
| 4,380,013 A | * | 4/1983 | Slysh .................... | 343/753 |
| 4,690,355 A | * | 9/1987 | Hornung et al. ...... | 244/173 |

FOREIGN PATENT DOCUMENTS

| | | |
|---|---|---|
| DE | 2110626 | 5/1973 |
| DE | 3223839 | 2/1983 |
| EP | 0858946 | 8/1998 |
| GB | 2103011 | 2/1983 |

* cited by examiner

Primary Examiner—Nam Nguyen
Assistant Examiner—Brian L. Mutschler
(74) Attorney, Agent, or Firm—Crowell & Moring LLP

(57) ABSTRACT

An extendible solar generator has an extendible solar cell structure and an extendible support array structure which has a first cross member and is connected with a stowage housing for the solar cell structure. The support array structure can be rolled out independently of the solar cell structure and has guiding devices for rolling out the solar cell structure after the array structure has rolled out.

30 Claims, 3 Drawing Sheets

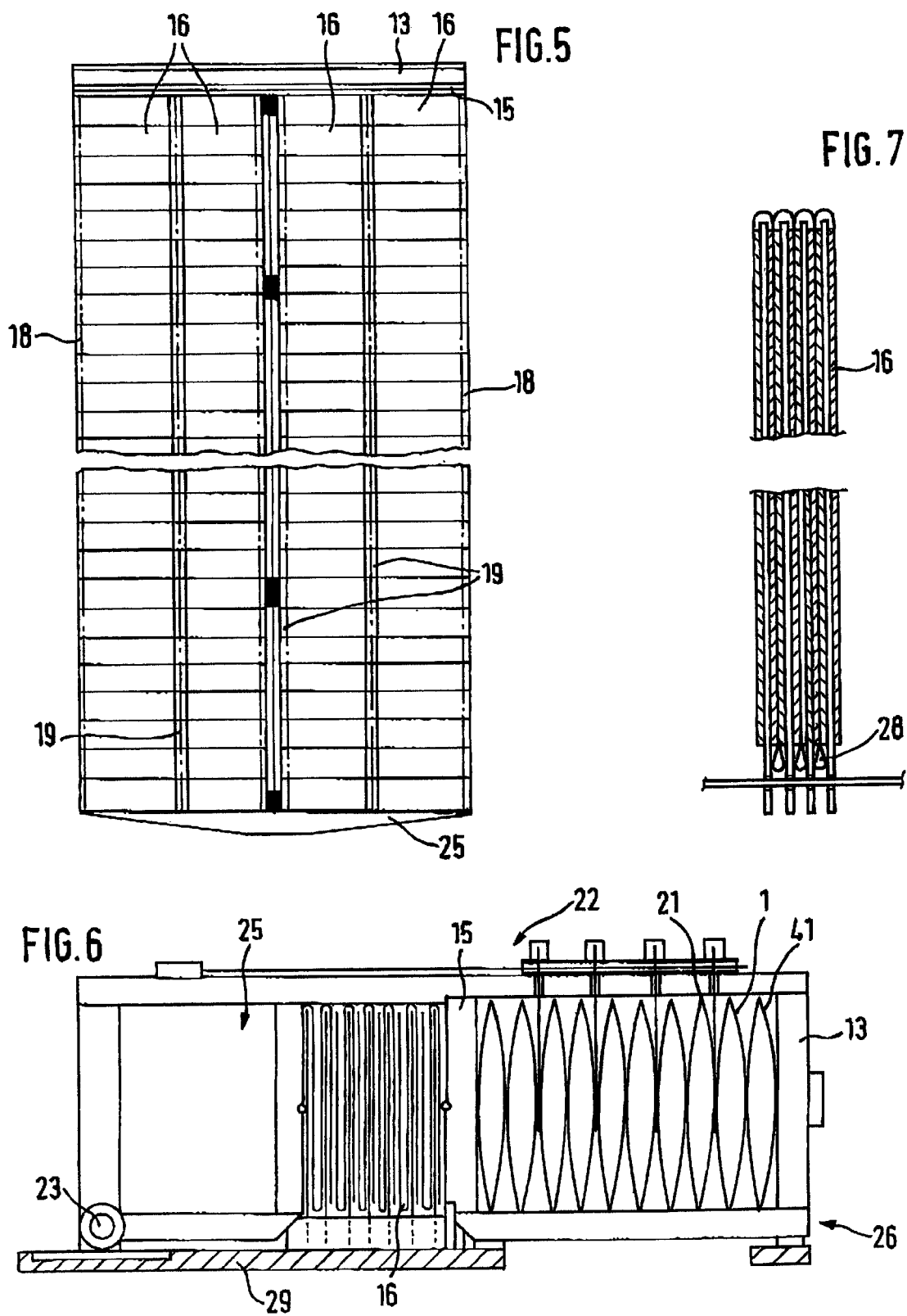

EXTENDIBLE SOLAR GENERATOR WITH AN EXTENDIBLE SUPPORTING ARRAY STRUCTURE

BACKGROUND AND SUMMARY OF THE INVENTION

This application claims the priority of German Patent Document 100 48 846.3, filed in Germany, Oct. 2, 2000, the disclosure of which is expressly incorporated by reference herein.

The present invention relates to an extendible solar generator with an extendible support array structure which can be used, for example, in the case of spacecraft but can also be used in other fields independently of applications in space operations technology.

An extendible support array structure is known, for example, from European Patent Document EP 0 858 946, in which a mast is described which consists of individual struts connected with one another in a scissors-type manner. From German Patent Document DE 2 110 626, extendible solar generators are known which are extended by means of telescopic rods or struts made of individual elements which are flexibly connected with one another at their ends. Solar generators are also described there which have struts which are formed by the rolling-off of a tape with internal tension (measuring tape effect). German Patent Document DE 32 23 839 describes a collapsible solar generator which is held by means of an unfurlable mast made of individual mast sections. In the case of these devices, an extendible solar cell structure is also extended as a result of the extending movement of the support array structure.

However, it is a disadvantage of this state of the art that a defined guided extension of the solar generator and particularly of the solar cell structure can take place only insufficiently, in which case there is also the danger of a damaging or even a jamming of the arrangement as a result of the mutual influencing of the extension movement of the support array structure and of the solar cell structure when the two structures are extended simultaneously.

It is therefore an object of the present invention to provide an extendible solar generator with an extendible array structure which ensures a reliable and defined rolling-out.

This object is achieved according to preferred embodiments of the invention by providing an extendible solar generator having an extendible solar cell structure, and an extendible support array structure which has a first cross member and is connected with a stowage housing for the solar cell structure, wherein the support array structure can be extended independently of the solar cell structure and has guiding devices for extending the solar cell structure after the extension of the support array structure has taken place.

An object of the present invention is an extendible solar generator with an extendible solar cell structure and an extendible support array structure with a first cross member, the support array structure being connected with a stowage housing for the solar cell structure. Such extendible solar cell structures can, for example, be rolled up or folded together in order to require a stowage space which is as small as possible. The solar cell structures are usually accommodated in stowage housings in order to protect them from destruction or damaging influences before they are operated.

According to the invention, it is now provided that the support array structure can be extended independently of the solar cell structure and has guiding devices for extending the solar cell structure after the support array structure has been extended. As a result, the extension movement of the support array structure is uncoupled from the extension movement of the solar cell structure. Each of the two movements can now be optimized separately and, during the operation, can be carried out by the respective other extension movement, so that a disturbing mutual influencing of the extension movements and the participating components can be avoided. On the contrary, after its extension has taken place, the support array structure forms a stable holding and guiding device for the subsequently occurring extending movement of the solar cell structure. As a result, the extending of the support array structure can take place first, in which case the second cross member first can remain connected with the stowage housing. It is only after the extension of the support array structure that the second cross member moves along the support array structure and takes along the solar cell structure connected with it.

For this purpose, it can particularly be provided according to certain preferred embodiments of the invention that a second cross member, which is connected with the solar cell structure and is longitudinally movably arranged with respect to the support array structure, and first guiding cables are provided as guiding devices, the first cross member and the second cross member being connected at their ends by the first guiding cables. The second cross member provides an advantageous stabilization of the free movable end of the solar cell structure and the punctually high forces transmitted by the guiding cables do not act directly upon the solar cell structure but, on the contrary, upon the more stable cross member, whereby the danger of damage to the solar cell structure by the extension movement is reduced.

In order to ensure a construction of the entire arrangement which is as compact and weight-reducing as possible, it may be provided according to certain preferred embodiments of the invention that the first cross member is constructed as part of a lid unit and the second cross members is constructed as an intermediate bottom of the stowage housing for the solar cell structure.

The stowage housing is preferably constructed according to certain preferred embodiments of the invention such that the part elements of the extendible support array structure in the closed condition of the stowage housing can be braced under prestress between the first cross member and the second cross member. This can take place, for example, by a corresponding design of the interior of the stowage housing, for example, just by its size. As a result, on the one hand, the extension movement of the support array structure during the opening of the stowage housing can be promoted by the then released prestress; on the other hand, for example, also reversibly deformable part elements for the support array structure may be provided which can then be deformed with respect to their height, whereby the required height of the stowage housing can be reduced.

In order to ensure a fixing of the solar cell structure which is as optimal as possible, particularly in the unfolded or extended condition, it may be provided that the flexible solar cell structure is connected with guiding cables which can be mounted between the second cross member and the stowage housing.

As described above, the flexible solar cell structure can be rolled up or folded before the mounting or can generally be arranged above one another in several layers. In order to protect the surface of the solar cell structure and compensate possible tolerances between the individual layers, it may be provided according to certain preferred embodiments of the invention that elastic separating foils are arranged between the individual layers.

The extendible support array structure may consist of several mutually connected part elements according to certain preferred embodiments of the invention which are reversibly deformable such that a change of the cross-sectional surface of the part elements can take place perpendicularly to their longitudinal dimension. Thus, the part elements can be compressed perpendicular to their longitudinal dimension by the effect of force or prestress, which reduces the require stowage volume of the part elements. When the effect of the force or prestress is eliminated again, the part elements will reversibly return to their original shape. On the other hand, the construction of the individual elements as part elements ensures a high stiffness of the individual elements as soon as the effect of the force or prestress was eliminated.

At their ends, the part elements are connected with one another by elastic elements according to certain preferred embodiments of the invention. As a result, the part elements can be stowed in the shape of an accordion, whereby a stack of individual part elements can be formed which rest upon one another perpendicular to the longitudinal dimension of the roll-out support array structure. Thus, a very compact stowage possibility is obtained for the individual part elements, in which case the stowage volume can be further reduced by the exercising of a corresponding force or prestress, as described above, by way of a deformation of the part elements. On the other hand, as a result of the suitable adjustment of the internal mechanical prestress of the elastic elements, it is achieved that, when the force or prestress is eliminated, an automatic unfolding of the support array structure can take place by this prestressing of the mechanical elements and thus an extension of the structure. The internal prestressing of the elastic elements also ensures the stiffness of the structure in the extended condition.

In order to ensure a reversible deformability of the part elements according to certain preferred embodiments of the invention, it is necessary to design the part elements elastically. In this case, the part elements themselves may consist of an elastic material. However, it may also be provided that the part elements consist of part segments which extend in the longitudinal direction of the part elements and which, along surface lines of the part elements, are connected with one another by additional elastic elements or joints. Thus, the part elements may be constructed as tube elements or, for example, as semi-cylindrical parts of tubes. If elastic elements are provided, the individual part segments may have additional elasticity which, however, as a rule, may be designed to be less than the elasticity of the additional elastic elements. The elastic elements may be constructed, for example, as springs, such as leaf springs.

Basically, the part elements may also be arranged in a single row of mutually connected tube elements according to certain preferred embodiments of the invention, so that, in the extended condition, an individual support, such as, for example, an individual strut or an individual mast, is created. However, it may also be provided that at least a first part element is connected at a first end with a first end of a second part element, and at a second end, is connected with a second end of a third, fourth and fifth part element. As a result, two rows of part elements can be formed which are arranged parallel to one another, in which case, the rows are connected with one another and, in the extended condition, form a double support array structure, thus, for example, a double strut or a double mast. In the following, this will be abbreviated as double structure. As a result of such a measure, the stiffness of the support array structure can be further increased.

In principle, all suitable materials, particularly elastic materials, can be used for the tube elements. Thus, the tube elements may, for example, consist of a carbon fiber material. Such a material has the additional advantage of a lower weight while the stiffness is relatively high.

Other objects, advantages and novel features of the present invention will become apparent from the following detailed description of the invention when considered in conjunction with the accompanying drawings.

BRIEF DESCRIPTION OF THE DRAWINGS

FIG. 5 is a schematic view of an unfolded solar generator after the rolling-out of the support array structure and the solar cell structure according to certain preferred embodiments of the invention;

FIG. 6 is a schematic view of a stowage housing for a solar generator according to FIG. 5; and FIG. 7 is a view of individual layers of the solar cell structure with the separating foil according to certain preferred embodiments of the invention.

DETAILED DESCRIPTION OF THE DRAWINGS

Figure 1:
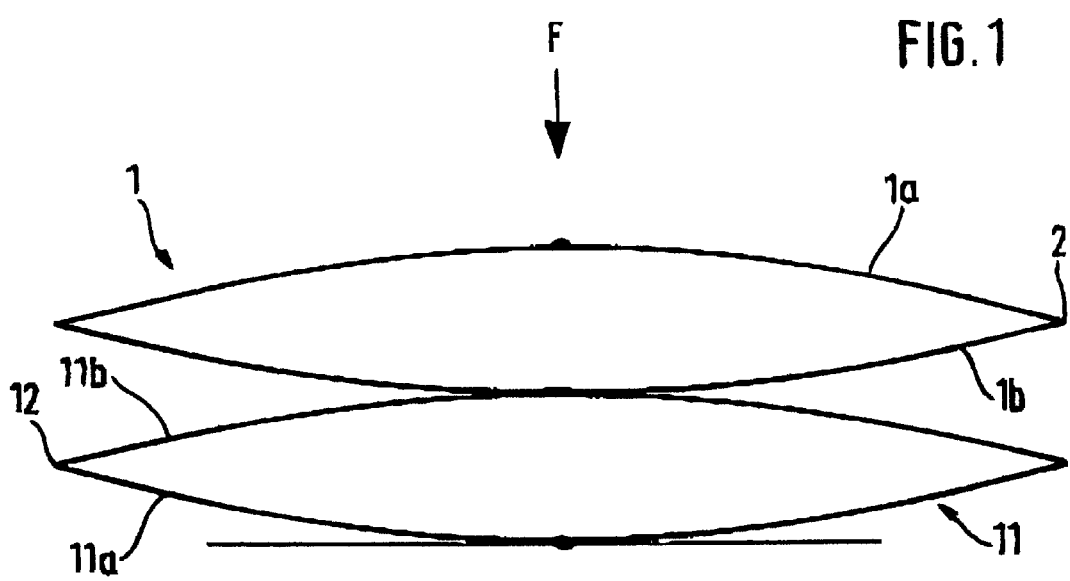
FIG. 1 is a cross-sectional schematic view of deformed part elements which are situated above one another in the form of tube elements in the stowed condition, constructed according to preferred embodiments of the invention.

FIG. 1 illustrates two deformed tube elements 1, 11 which are situated above one another as part elements of the extendible support array structure of a an extendible solar generator in the stowed condition, the lower tube element 11 being supported, for example, by another tube element, which is not shown, or by a supporting surface. A perpendicularly acting force or prestress F is exercised on the upper tube element 1 and leads to a deformation of the tube elements 1, 11, whereby the illustrated cross-sectional surface changes perpendicularly to the longitudinal dimension of the tube elements 1, 11.

Figure 3:
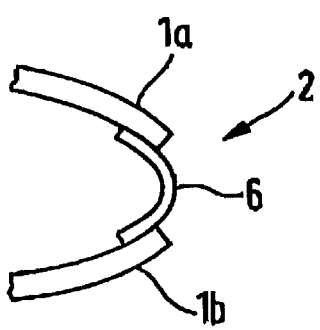
FIG. 3 is a schematic representation of an elastic element along a surface line of a tube element of the FIG. 1 arrangement.

The tube elements 1, 11 in FIG. 1 comprises two semi-cylindrical (or part cylindrical) hollow part segments 1a, 1b, 11a, 11b respectively which each have a certain elasticity. These may consist, for example, of a carbon fiber material. At the intersection lines 2, 12 along surface lines of the tube elements 1, 11, the part segments 1a, 1b, 11a, 11b are connected with one another by elastic elements 6, as illustrated in FIG. 3, such as leaf springs, or, as an alternative, by means of joints.

Figure 2:
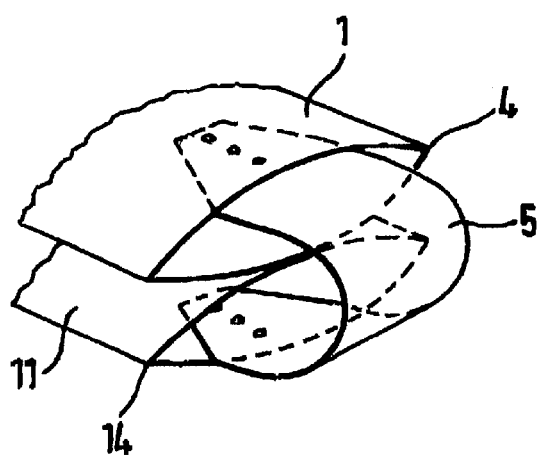
FIG. 2 is a schematic representation of an elastic element at the end of the tube elements of the FIG. 1 arrangement.

At their ends 4, 14, the tube elements 1, 11 are connected with one another by elastic elements 5, such as leaf spring arrangements, as schematically illustrated in FIG. 2.

FIG. 2 represents a single strut or a single mast; that is, the mast or the strut would be formed here only by a single row of tube elements 1, 11. However, a double structure may also be provided so that the support array structure in the extended condition forms a double strut or a double mast. The special development of the elastic elements can be adapted according to specific in use requirements with respect to the elasticity and the stiffness.

Figure 4C:
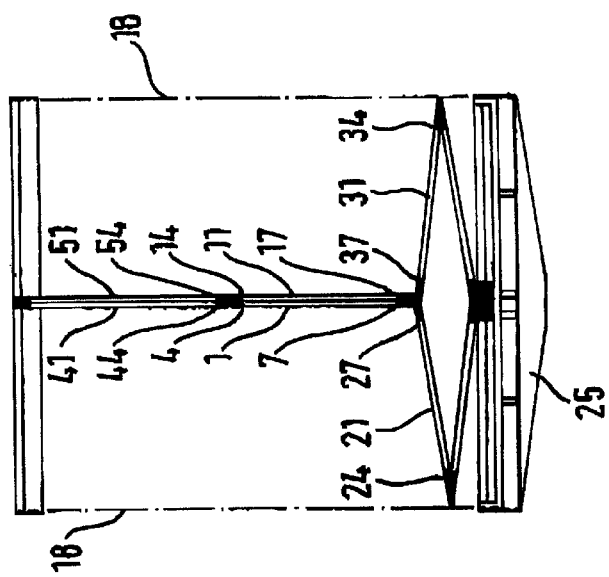
FIGS. 4a to 4c are schematic representations depicting the rolling-out of a double structure as a support array structure of a solar generator according to certain preferred embodiments of the invention.
Figure 4B:
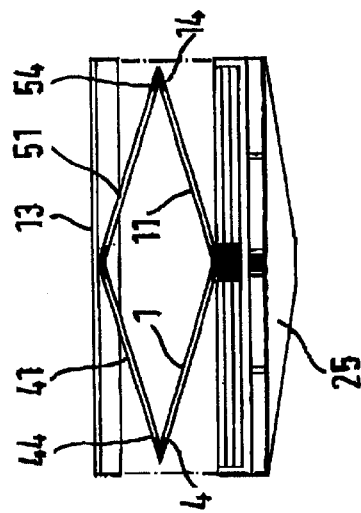
Figure 4A:
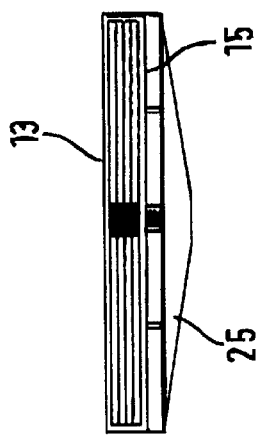

FIGS. 4a–4b illustrate the extending of a double structure from a stowed condition (FIG. 4a) into a partially rolled-out condition (FIG. 4c). In the stowed condition (FIG. 4a), the tube elements are situated in two stacks on one another perpendicular to the extension direction and are held under prestress between an upper cross member 13 and a lower cross member 15, which prestress deforms the tube elements in order to achieve a stowage volume which is as low as possible.

As illustrated in FIGS. 4a–4c, the tube elements 1, 11, 21, 31 are connected by means of elastic elements at one of their ends 7, 17, 27, 37. This connection forms an X-shaped hinge so that the tube elements 1, 11, 21, 31 can be swiveled with respect to one another. In the extended condition of the structure, the tube elements 1 and 11 as well as 21 and 31, however, rest against one another in an area of a surface line.

When the prestress is now eliminated, the flexible elements 5 at the ends of the tube elements cause the unfolding and thus the extension of the structure. In this case, a condition (FIG. 4b) is first reached in which the first tube elements 1, 11, 41, 51 are extended, in which case the tube elements 1 and 41 are connected with one another at the first ends 4, 44 and the tube elements 11 and 51 are connected at the first ends 14 and 54. Furthermore, the tube elements 41 and 51 are connected in a hinged manner with the upper cross member 13. Because, as illustrated in FIG. 4c, the tube elements 1 and 11 are connected with one another at their second ends 7, 17 and are connected with the second ends 27, 37 of the adjoining tube elements 21, 31, the structure is continued to be held together in condition b and the tube elements 41 and 51 as well as 1 and 11 are automatically arranged parallel to one another, as illustrated in FIG. 4c. The extending operation is now continued with the unfolding of the next tube elements 21 and 31 as well as the additional tube elements adjoining them at their first ends 24 and 34 until the full extension of the double structure has taken place.

The upper cross member 13 forms a part of the lid unit 26 of a stowage housing 22 for the arrangement of the extendible support array structure consisting of tube elements 1, 11, 21, 31, 41, 51 and the solar cell structure 16; the second cross member 15 forms an intermediate bottom and is detachably connected with a bottom unit 25 of the stowage housing 22. As illustrated in FIG. 6, the folded tube elements 1, 11, 21, 31, 41, 51 can be braced under prestress in this stowage housing 22 between the first cross member 13 and the second cross member 15, in which case the tube elements 1, 21, 41 situated on one another are deformed in a space-saving manner. The solar cell structure 16 is stowed below the second cross member 15 in the stowage housing 22, in FIG. 6 specifically in a folded form, in which case elastic separating foils 28 are arranged between the individual layers of the solar cell structure 16.

The extending of the support array structure and of the first cross member 13 connected therewith takes place corresponding to the description concerning FIGS. 4a to 4c. In this case, it should be noted that the second cross member 15 still remains connected with the bottom unit 25 during the extending of the tube elements 11, 21, 31, 41, 51. The solar cell structure 16 also still remains in its stowage space in the bottom unit 25. The support array structure is extended completely, in which case a defined extension can be ensured as a result of the guiding cables 18 at the ends of the cross members.

After the extension of the support array structure, the second cross member 15 can now be detached from the bottom unit 25 and can be moved along the support array structure in the direction toward the first cross member 13. This can also take place by means of the guiding cables 18, if, in the first cross member 13, the guiding cables 18 are led, for example, by way of deflection pulleys, and the guiding cables 18 are connected with the second cross member 15, on the one side, and with a motor, on the other side. Since the second cross member 15 is connected with the solar cell structure 16, with the movement of the second cross member 15, the solar cell structure 16 is also moved toward the first member 13 and is therefore unfolded and mounted. This situation is illustrated in FIG. 5. For a better fixing of the solar cell structure 16, additional guiding cables 19 are provided which are mounted between the second cross member 15 and the bottom unit 25 and which are connected with the solar cell structure 16. As illustrated in FIG. 5, the solar cell structure 16 is formed in this case by individual webs with solar cells, in the example according to FIG. 5, two webs respectively being arranged on one side of the tube element support array structure. The number and length of the webs can be adapted according to the requirements. Furthermore, an arrangement according to FIG. 5 shows the advantage that the individual webs are situated in one plane with the array structure, whereby no momentums are created between the array structure and the webs. In contrast thereto, for example, in an arrangement of the prior art according to German Patent Document DE 32 23 839, the array structure is situated behind the plane of the solar cell structure, so that mechanical momentums may occur here.

In order to achieve an even more compact housing of the arrangement, it may be provided that the stowage housing 22 is swivelable about an axis 23 connected with a base element 29, for example, a base plate. This can further reduce the height of the stowage housing 22 during a transport of the entire arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Extendible solar generator having an extendible solar cell structure, and an extendible support array structure which has a first cross member and is connected with a stowage housing for the solar cell structure, wherein the support array structure is extendible independently of the solar cell structure and has guiding devices for extending the solar cell structure after the extension of the support array structure has taken place, wherein the guiding devices include a second cross member which is connected with the solar cell structure and is longitudinally arranged with respect to the support array structure, and first guiding cables, and wherein the first cross member and the second cross member are connected at their ends by the first guiding cables.

2. Solar generator according to claim 1, wherein the first cross member is constructed as part of a lid unit and the second cross member is constructed as an intermediate bottom of the stowage housing for the solar cell structure.

3. Solar generator according to claim 2, wherein the stowage housing is constructed such that part elements of the extendible support array structure in a closed condition of the stowage housing are braced under prestress between the first cross member and the second cross member.

4. Solar generator according to claim 1, wherein the solar cell structure is connected with additional guiding cables mounted between the second cross member and the stowage housing.

5. Solar generator according to claim 2, wherein the solar cell structure is connected with additional guiding cables mounted between the second cross member and the stowage housing.

6. Solar generator according to claim 3, wherein the solar cell structure is connected with additional guiding cables mounted between the second cross member and the stowage housing.

7. Solar generator according to claim 1, wherein the solar cell structure is arranged in several individual layers above one another and elastic separating foils are arranged between the individual layers.

8. Solar generator according to claim 2, wherein the solar cell structure is arranged in several individual layers above one another and elastic separating foils are arranged between the individual layers.

9. Solar generator according to claim 3, wherein the solar cell structure is arranged in several individual layers above one another and elastic separating foils are arranged between the individual layers.

10. Solar generator according to claim 4, wherein the solar cell structure is arranged in several individual layers above one another and elastic separating foils are arranged between the individual layers.

11. Solar generator according to claim 3, wherein the support array structure comprises several mutually connected part elements, the part elements being formed by tube elements which are reversibly deformable such that a change of a cross-sectional surface of the part elements takes place perpendicularly to their longitudinal dimension and the part elements are connected with one another at their ends by elastic elements.

12. Solar generator according to claim 4, wherein the support array structure comprises several mutually connected part elements, the part elements being formed by tube elements which are reversibly deformable such that a change of a cross-sectional surface of the part elements takes place perpendicularly to their longitudinal dimension and the part elements are connected with one another at their ends by elastic elements.

13. Solar generator according to claim 7, wherein the support array structure comprises several mutually connected part elements, the part elements being formed by tube elements which are reversibly deformable such that a change of a cross-sectional surface of the part elements takes place perpendicularly to their longitudinal dimension and the part elements are connected with one another at their ends by elastic elements.

14. Solar generator according to claim 10, wherein the support array structure comprises several mutually connected part elements, the part elements being formed by tube elements which are reversibly deformable such that a change of a cross-sectional surface of the part elements takes place perpendicularly to their longitudinal dimension and the part elements are connected with one another at their ends by elastic elements.

15. Solar generator according to claim 11,
wherein the part elements consist of an elastic material.

16. Solar generator according to claim 12,
wherein the part elements consist of an elastic material.

17. Solar generator according to claim 13,
wherein the part elements consist of an elastic material.

18. Solar generator according to claim 14,
wherein the part elements consist of an elastic material.

19. Solar generator according to claim 11,
wherein the part elements consist of a carbon fiber material.

20. Solar generator according to claim 12,
wherein the part elements consist of a carbon fiber material.

21. Solar generator according to claim 13,
wherein the part elements consist of a carbon fiber material.

22. Solar generator according to claim 14,
wherein the part elements consist of a carbon fiber material.

23. Solar generator according to claim 11,
wherein the part elements are constructed as tube elements.

24. Extendible solar generator having an extendible solar cell structure, and an extendible support array structure which has a first cross member and is connected with a stowage housing for the solar cell structure, wherein the support array structure is extendible independently of the solar cell structure and has guiding devices for extending the solar cell structure after the extension of the support array structure has taken place, wherein the guiding devices include a second cross member which is connected with the solar cell structure and is longitudinally arranged with respect to the support array structure, and first guiding cables, wherein the first cross member and the second cross member are connected at their ends by the first guiding cables, wherein the first cross member is constructed as part of a lid unit and the second cross member is constructed as an intermediate bottom of the stowage housing for the solar cell structure, wherein the stowage housing is constructed such that part elements of the extendible support array structure in a closed condition of the stowage housing are braced under prestress between the first cross member and the second cross member, wherein the support array structure comprises several mutually connected part elements, the part elements being formed by tube elements which are reversibly deformable such that a change of a cross-sectional surface of the part elements takes place perpendicularly to their longitudinal dimension and the part elements are connected with one another at their ends by elastic elements, and wherein a first of the part elements is connected at a first end with an end of a second of the part elements and at a second end with ends of third, fourth and fifth part elements.

25. Solar generator according to claim 24,
wherein the part elements consist of an elastic material.

26. Solar generator according to claim 24,
wherein the part elements consist of a carbon fiber material.

27. Extendible solar generator having an extendible solar cell structure, and an extendible support array structure which has a first cross member and is connected with a fly stowage housing for the solar cell structure, wherein the support array structure is extendible independently of the solar cell structure and has guiding devices for extending the solar cell structure after the extension of the support array structure has taken place, wherein the guiding devices include a second cross member which is connected with the solar cell structure and is longitudinally arranged with respect to the support array structure, and first guiding cables, wherein the first cross member and the second cross member are connected at their ends by the first guiding cables, wherein the solar cell structure is connected with additional guiding cables mounted between the second cross member and the stowage housing, wherein the support array structure comprises several mutually connected part elements, the part elements being formed by tube elements which are reversibly deformable such that a change of a cross-sectional surface of the part elements takes place perpendicularly to their longitudinal dimension and the part elements are connected with one another at their ends by elastic elements, and wherein a first of the part elements is connected at a first end with an end of a second of the part elements and at a second end with ends of third, fourth and fifth part elements.

28. Extendible solar generator having an extendible solar cell structure, and an extendible support array structure which has a first cross member and is connected with a stowage housing for the solar cell structure, wherein the support array structure is extendable independently of the solar cell structure and has guiding devices for extending the solar cell structure after the extension of the support array structure has taken place, wherein the solar cell structure is arranged in several individual layers above one another and elastic separating foils are arranged between the individual layers, wherein the support array structure comprises several mutually connected part elements, the part elements being formed by tube elements which are reversibly deformable such that a change of a cross-sectional surface of the part elements takes place perpendicularly to their longitudinal dimension and the part elements are connected with one another at their ends by elastic elements, and wherein a first of the part elements is connected at a first end with an end of a second of the part elements and at a second end with ends of third, fourth and fifth part elements.

29. Extendible solar generator having an extendible solar cell structure, and an extendible support array structure which has a first cross member and is connected with a stowage housing for the solar cell structure, wherein the support array structure is extendible independently of the solar cell structure and has guiding devices for extending the solar cell structure after the extension of the support array structure has taken place, wherein the guiding devices include a second cross member which is connected with the solar cell structure and is longitudinally arranged with respect to the support array structure, and first guiding cables, wherein the first cross member and the second cross member are connected at their ends by the first guiding cables, wherein the solar cell structure is connected with additional guiding cables mounted between the second cross member and the stowage housing, wherein the solar cell structure is arranged in several individual layers above one another and elastic separating foils are arranged between the individual layers, wherein the support array structure comprises several mutually connected part elements, the part elements being formed by tube elements which are reversibly deformable such that a change of a cross-sectional surface of the part elements takes place perpendicularly to their longitudinal dimension and the part elements are connected with one another at their ends by elastic elements, and wherein a first of the part elements is connected at a first end with an end of a second of the part elements and at a second end with ends of third, fourth and fifth part elements.

30. Extendible solar generator having an extendible solar cell structure, and an extendible support array structure which has a first cross member and is connected with a stowage housing for the solar cell structure, wherein the support array structure is extendible independently of the solar cell structure and has guiding devices for extending the solar cell structure after the extension of the support array structure has taken place, wherein the guiding devices include a second cross member which is connected with the solar cell structure and is longitudinally arranged with respect to the support array structure, and first guiding cables, wherein the first cross member and the second cross member are connected at their ends by the first guiding cables, wherein the first cross member is constructed as part of a lid unit and the second cross member is constructed as an intermediate bottom of the stowage housing for the solar cell structure, wherein the stowage housing is constructed such that part elements of the extendible support array structure in a closed condition of the stowage housing are braced under prestress between the first cross member and the second cross member, wherein the support array structure comprises several mutually connected part elements, the part elements being formed by tube elements which are reversibly deformable such that a change of a cross-sectional surface of the part elements takes place perpendicularly to their longitudinal dimension and the part elements are connected with one another at their ends by elastic elements, and wherein the part elements consist of an elastic carbon fiber material.

* * * * *